Figure 1:
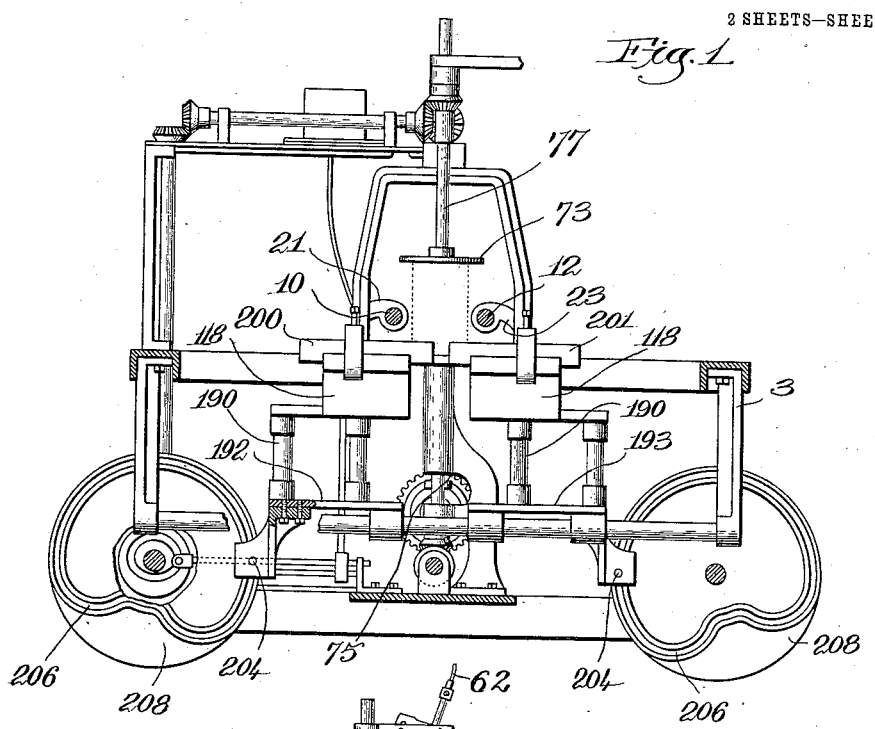

J. A. BOOTH.
CAN SOLDERING MACHINE.
APPLICATION FILED JULY 14, 1909.

1,018,159.

Patented Feb. 20, 1912.
2 SHEETS—SHEET 1.

Witnesses.
Thomas J. Drummond.
Joseph M. Ward.

Inventor.
James A. Booth,
by Crosby Gregory
Attys.

J. A. BOOTH.
CAN SOLDERING MACHINE.
APPLICATION FILED JULY 14, 1909.
1,018,159.
Patented Feb. 20, 1912.
2 SHEETS—SHEET 2.
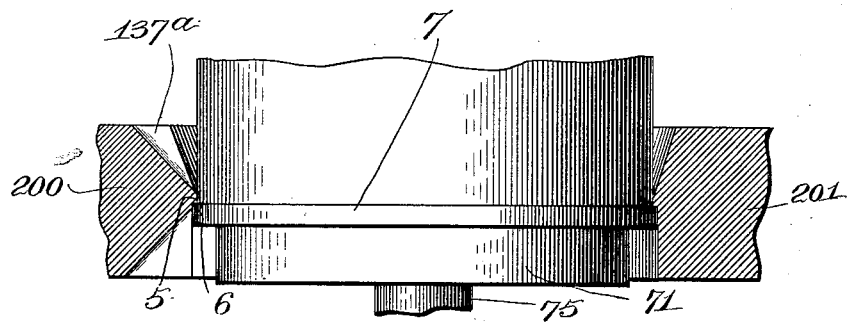
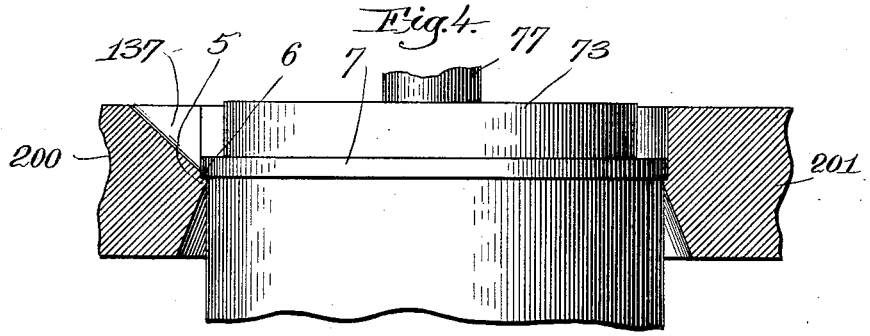
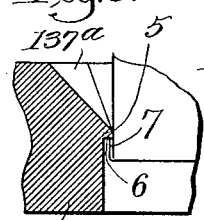
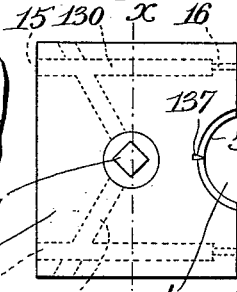
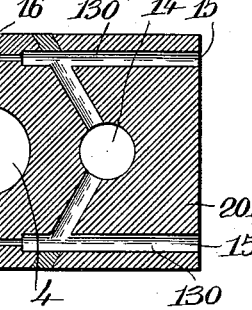
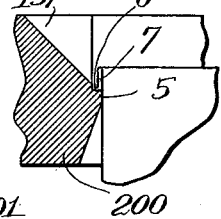
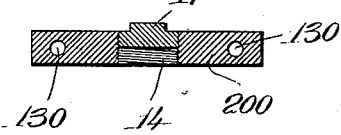
Witnesses.
Thomas J. Drummond
S. Wm. Lutton
Inventor.
James A. Booth,
By Crosby Gregory.
Attys.

UNITED STATES PATENT OFFICE.

JAMES A. BOOTH, OF EVERETT, MASSACHUSETTS, ASSIGNOR OF ONE-HALF TO ROSELLE WYLLYS AND ONE-HALF TO ERNEST L. GAY, BOTH OF BOSTON, MASSACHUSETTS.

CAN-SOLDERING MACHINE.

1,018,159. Specification of Letters Patent. Patented Feb. 20, 1912.

Application filed July 14, 1909. Serial No. 507,507.

*To all whom it may concern:*

Be it known that I, JAMES A. BOOTH, a citizen of the United States, residing at Everett, county of Middlesex, and State of Massachusetts, have invented an Improvement in Can-Soldering Machines, of which the following description, in connection with the accompanying drawing, is a specification, like letters on the drawing representing like parts.

This invention has reference to can soldering machines and is an important improvement upon the invention illustrated in my Patent No. 766,162, dated August 2, 1904. The device illustrated in said patent includes a plurality of independent rotatable can holders, each constructed to receive the cans singly, and a can-feeding device which operates to feed a can to the first can holder, within which said can is held and rotated while an acid is applied thereto, and then to feed said can to the next succeeding can holder in which it is held and rotated while the soldering operation is performed, the said feeding device then operating to deliver the can from the can holder. The soldering operation is performed by means of a heated solder plate, which has a semi-circular recess in one edge adapted to fit the can. When the can is held in the can-holder and the plate is brought into operative position, the solder which is fed to a solder groove in said plate is melted by the heated plate, and runs down the groove to the part of the can to be soldered, and the rotation of the can operates to distribute the solder as needed. In said patent the plate employed for top soldering is different from that used for bottom soldering, and a complete equipment, therefore, requires two plates, one for top soldering and one for bottom soldering. In my experiments with this machine I have discovered that by constructing this plate in a special way it can, by simply being reversed, be used for either top or bottom soldering according to the position of the plate; and this invention relates to a soldering machine having a reversible solder plate which is adapted for either top or bottom soldering.

Figure 2:
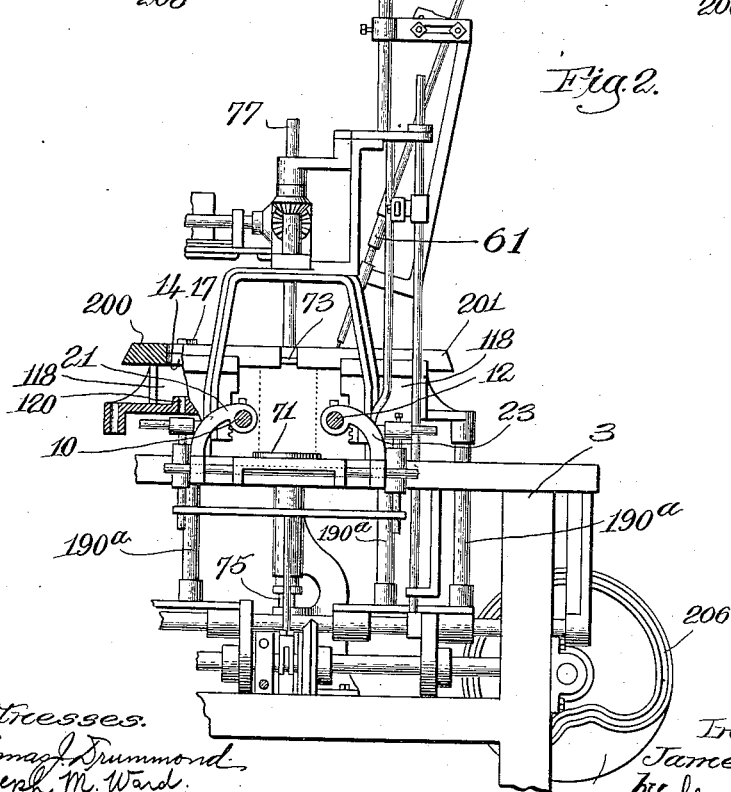

Figure 1 is a view of a portion of my machine showing the parts in position for bottom soldering; Fig. 2 is an end view of a portion of the machine showing the parts in position for top soldering; Fig. 3 is an enlarged detail of a portion of the plate as arranged for bottom soldering; Fig. 4 is a similar view of a plate reversed and in position for top soldering; Figs. 5 and 6 are diagrams hereinafter referred to; Fig. 7 is a plan view of one section of my improved plate; Fig. 8 is a horizontal section of the other section; Fig. 9 is a section on the line $x$—$x$, Fig. 7.

I have not herein attempted to illustrate the complete can soldering machine, but I have shown a sufficient part thereof to fully illustrate the operation of my improvements.

For a full and complete description of the operation of the machine reference may be had to said patent.

In the drawings I have illustrated only one of the can holders, that is, the can holder which holds the can during the soldering operation, it being understood that a similar can holder is used for holding and rotating the can when the flux or acid is applied thereto.

Referring briefly to the general construction of the machine, the frame 3 is of suitable construction to support the can holders, one of which is shown and which comprises the clamping disks 71, 73, between which the cans are held and rotated, said disks being mounted upon shafts 75 and 77 respectively. The shafts are rotated in some suitable way all as illustrated in my above mentioned patent.

The can-feeding mechanism comprises the two reciprocating members 10 and 12, which will have thereon the projections, not shown, to engage the can and feed the same forward as in the above mentioned patent, said rods being mounted at their ends in bearings 21, 23, respectively.

200 and 201 designate suitable solder plates which are supported to reciprocate toward and from the can holders, the plates moving outwardly from each other to allow a can to be received by the can holder, and then moving toward the can holder to be brought into operative position. For this purpose the frame of the machine supports suitable slides 192 and 193, having posts 190 rising therefrom, on which posts the plates 200 and 201 are secured, and the slides are moved back and forth at the proper times by means of pins 204, operating in cam grooves 206 formed in the disks 208. The parts thus far described are and may be all as shown in my above-mentioned patent to which reference may be had, and as they form no part of my present invention further description thereof is not deemed necessary herein.

The form of plate which I employ and which enables me to do either top or bottom soldering, as desired, is illustrated in Figs. 3, 4, 7, 8 and 9, and I will preferably use a pair of plates 200 and 201 which are separable from each other. Each plate has the semi-circular recess or cutaway portion 4, which is shaped to fit the can, and said recessed portion has a rib thereon forming a shoulder which is adapted to sit under the downturned edge or over the upturned edge of the can end. In Figs. 3 and 4 the rib is designated by 5 and the shoulder formed thereby by 6.

In soldering the bottom on the can, the plates will be given the position shown in Figs. 3 and 5 so that the shoulder 6 will face downwardly, and when the can is supported in the can holder, said shoulder will project over the upturned rim 7 on the can end, as clearly seen in Fig. 5. The solder-delivery groove $137^a$ has its lowest portion substantially at the edge of the rib 5, and as the wire or ribbon 62 of solder is fed to the groove from the solder-supporting mechanism 61, the solder becomes melted and the melted solder is delivered from the lower end of the groove $137^a$ against the can body and will soak down between the can body and the rib by capillary attraction and will also run into and fill the space between the rim and the can body as the can is rotated, thus sealing the can. For soldering the top on the can the plates are reversed and given the position shown in Figs. 4 and 6, and when in this reversed position they are so arranged that the shoulders 6 face upwardly and extend under the downturned edge or rim 7 on the can end. The shoulder 6 is slightly below the lower edge of said downturned rim 7, as seen in Fig. 6, so as to leave sufficient space for the melted solder to flow under said rim and soak up in the space between the can end and can body. When used for top soldering the solder which is delivered from the lower end of the groove 137 flows under the rim 7 and as the can is rotated the melted solder will soak up into the space between the rim and can body by capillary attraction. A certain amount of solder will tend to pass down between the can body and the rib 5, but I have found from experience that for some reason the capillary attraction between the can body and the rim 7 is enough greater than that between the can body and plate to prevent any appreciable waste of solder. It will thus be seen that by simply reversing the position of the plate both top and bottom soldering can be accomplished by means of a single plate, thus doing away with the necessity of having a special plate for the top soldering different from that employed for the bottom soldering.

The plate may be heated in any suitable way, either by electricity or by gas, and for convenience I have herein shown a plate adapted to be heated by gas as in my before mentioned patent. For this purpose each plate will be provided with an aperture 14, which will be situated directly over a gas jet 120, the said plates each having the circulating chambers 130 through which the mixed gas and air circulates and in which the mixture burns, and in order to provide the best possible circulation these chambers open to the atmosphere both in the front and back of each section, as shown at 15 and 16.

17 designates a removable plug which closes the upper end of the aperture 14 and compels the combustible products to pass into the circulating chambers. When the plate is reversed the plug 17 will be removed and placed in the opposite end of the aperture 14 so that in whichever position the plate is the plug will be in the upper side thereof.

I would here remark that when the machine is used for bottom soldering the posts 190, which support the burners 118 to which the plates 200, 201, are secured, will be of such a length as to bring the plates into the proper position, but when the device is to be changed over to adapt it for top soldering the posts 190 will be removed and longer posts $190^a$ inserted therein which are of a length to elevate the burners and plates to the proper position for top soldering, as seen in Fig. 2.

Believing I am the first to employ a reversible solder plate whereby either top or bottom soldering may be accomplished according to the position of the plate, I desire to claim the same broadly, and would consider as coming within my invention any solder machine having a reversible solder plate, however constructed.

Having fully described my invention, what I claim as new and desire to secure by Letters Patent is:—

1. In a can-soldering machine, a can holder, soldering-supporting mechanism, and a reversible solder plate whereby either top or bottom soldering may be accomplished according to the position of the plate.

2. In a can-soldering machine, a can holder, a reversible solder plate, and means to rotate one of said parts relative to the other, the reversible plate allowing either bottom or top soldering to be accomplished according to its position.

3. In a can-soldering machine, a can holder and a reversible solder plate having a soldering edge shaped to fit the can, said edge having a shoulder to extend under the downturned rim of the can end when the device is used for top soldering, and over the edge of the upturned rim of the can end when the device is used for bottom soldering.

4. In a can-soldering machine, a rotatable can holder and a reversible solder plate having an edge recessed to fit the can, said edge having a shoulder to extend under the downturned rim of the can end when the device is used for top soldering, and over the upturned edge of the can end when the device is used for bottom soldering, and means to heat the plate.

5. In a can-soldering machine, a can holder and a soldering plate provided with a semi-circular recess to fit the can, a shoulder projecting from the concaved face of said recess and adapted to extend under the downturned rim of the can end when the device is used for top soldering, and over the upturned edge of the can end when the device is used for bottom soldering, and a solder-delivery groove on each side of said plate.

6. In a can-soldering machine, a can holder, a soldering plate having a soldering edge shaped to fit the exterior of the can, a rib projecting from said edge and forming a shoulder adapted to extend over the upturned edge of the can end when the device is used for bottom soldering, and under the downturned edge of the can end when the device is used for top soldering.

7. A reversible soldering plate for a can-soldering machine, said plate being provided with circulating chambers, openings leading from said chambers to both sides of the plate, and a removable plug to close one of said openings.

8. A reversible soldering plate for can-soldering machines having an opening extending through the same a circulating chamber in the body of the plate and communicating with the opening, and a removable plug to close said opening at one end.

9. In a can-soldering machine, a can holder, a reversible soldering plate adapted for either top or bottom soldering according to the position of the plate, a gas jet beneath the plate, said plate having an opening therethrough above the gas jet, and circulating chambers leading from the opening through the body of the plate, and a removable plug to close the top end of the opening.

10. In a can-soldering machine, a can holder, a reversible solder plate adapted for soldering either the top or bottom of the can according to the position of said plate, solder-supporting mechanism, and means to give the can and solder plate a relative movement during the soldering operation.

11. In a can-soldering machine, a can holder, a soldering plate provided with a semi-circular recess to fit the can and having a shoulder projecting from the concaved face of the recess, said shoulder adapted to extend under the downturned rim of the can end when the device is used for top soldering, and over the upturned edge of the can end when the device is used for bottom soldering, solder-supporting mechanism, and means to give the can holder and soldering plate a relative movement during the soldering operation.

In testimony whereof, I have signed my name to this specification, in the presence of two subscribing witnesses.

JAMES A. BOOTH.

Witnesses:
Louis C. Smith,
Thomas J. Drummond.

---

Copies of this patent may be obtained for five cents each, by addressing the " Commissioner of Patents, Washington, D. C."